(12) United States Patent
Yamamoto et al.

(10) Patent No.: US 7,969,294 B2
(45) Date of Patent: *Jun. 28, 2011

(54) ONBOARD DISPLAY DEVICE, ONBOARD DISPLAY SYSTEM AND VEHICLE

(75) Inventors: Takeshi Yamamoto, Soraku-gun (JP); Aki Miake, Nara (JP); Toshiya Takahashi, Soraku-gun (JP); Megumi Itoh, Nara (JP); Mitsukazu Okuda, Ikoma (JP); Takeshi Doi, Kashiwara (JP); Takeo Abe, Suita (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/827,167

(22) Filed: Jun. 30, 2010

(65) Prior Publication Data

US 2010/0265053 A1 Oct. 21, 2010

Related U.S. Application Data

(63) Continuation of application No. 12/103,167, filed on Apr. 15, 2008, which is a continuation of application No. 10/598,098, filed as application No. PCT/JP2005/002836 on Feb. 16, 2005.

(30) Foreign Application Priority Data

Feb. 20, 2004 (JP) ................................. 2004-045471

(51) Int. Cl.
*B60Q 1/00* (2006.01)
*G08B 3/00* (2006.01)
*G08G 1/123* (2006.01)
*G01C 21/00* (2006.01)
*G09G 5/00* (2006.01)

(52) U.S. Cl. ........ 340/461; 340/438; 340/441; 340/462; 340/691.6; 340/995.14; 701/200; 345/9

(58) Field of Classification Search .................. 340/438, 340/441, 461, 462, 691.6, 815.4, 995.1, 995.14, 340/995.17, 995.26, 995.27, 995.28; 701/200, 701/208, 211, 212; 345/7, 8, 9
See application file for complete search history.

(56) References Cited

U.S. PATENT DOCUMENTS 6,157,297 A   12/2000 Nakai
6,477,464 B2 * 11/2002 McCarthy et al. ............ 701/213

OTHER PUBLICATIONS

Nakamura et al. JP6-195056, Jul. 1994.*
Yamamoto et al.; "Onboard Display Device, Onboard Display System and Vehicle"; U.S. Appl. No. 10/598,098, filed Aug. 17, 2006.

(Continued)

*Primary Examiner* — Daniel Wu
*Assistant Examiner* — Mark Rushing
(74) *Attorney, Agent, or Firm* — Keating & Bennett, LLP

(57) ABSTRACT

An onboard display device includes a display section attached to an instrument panel of a vehicle. The section has a second display area and a first display area. The second display area shows at least the speed as vehicle condition images indicating the conditions of the vehicle. The first display area shows a navigation image and other secondary images. The display section measures greater in width than in height with an aspect ratio of 7:3 or greater. The aspect ratio is the width/height ratio of a display area. The onboard display device allows for a visibility-improved simultaneous display of the secondary image, such as a navigation image, and the vehicle condition image, such as a speed display, which presents information on the conditions of the vehicle.

12 Claims, 12 Drawing Sheets

OTHER PUBLICATIONS

Yamamoto et al.; "Onboard Display Device, Onboard Display System and Vehicle"; U.S. Appl. No. 12/103,158, filed Apr. 15, 2008.
Yamamoto et al.; "Onboard Display Device, Onboard Display System and Vehicle"; U.S. Appl. No. 12/103,164, filed Apr. 15, 2008.
Yamamoto et al.; "Onboard Display Device, Onboard Display System and Vehicle"; U.S. Appl. No. 12/103,167, filed Apr. 15, 2008.
Official Communication issued in corresponding U.S. Appl. No. 12/103,158, mailed on Aug. 6, 2010.

* cited by examiner

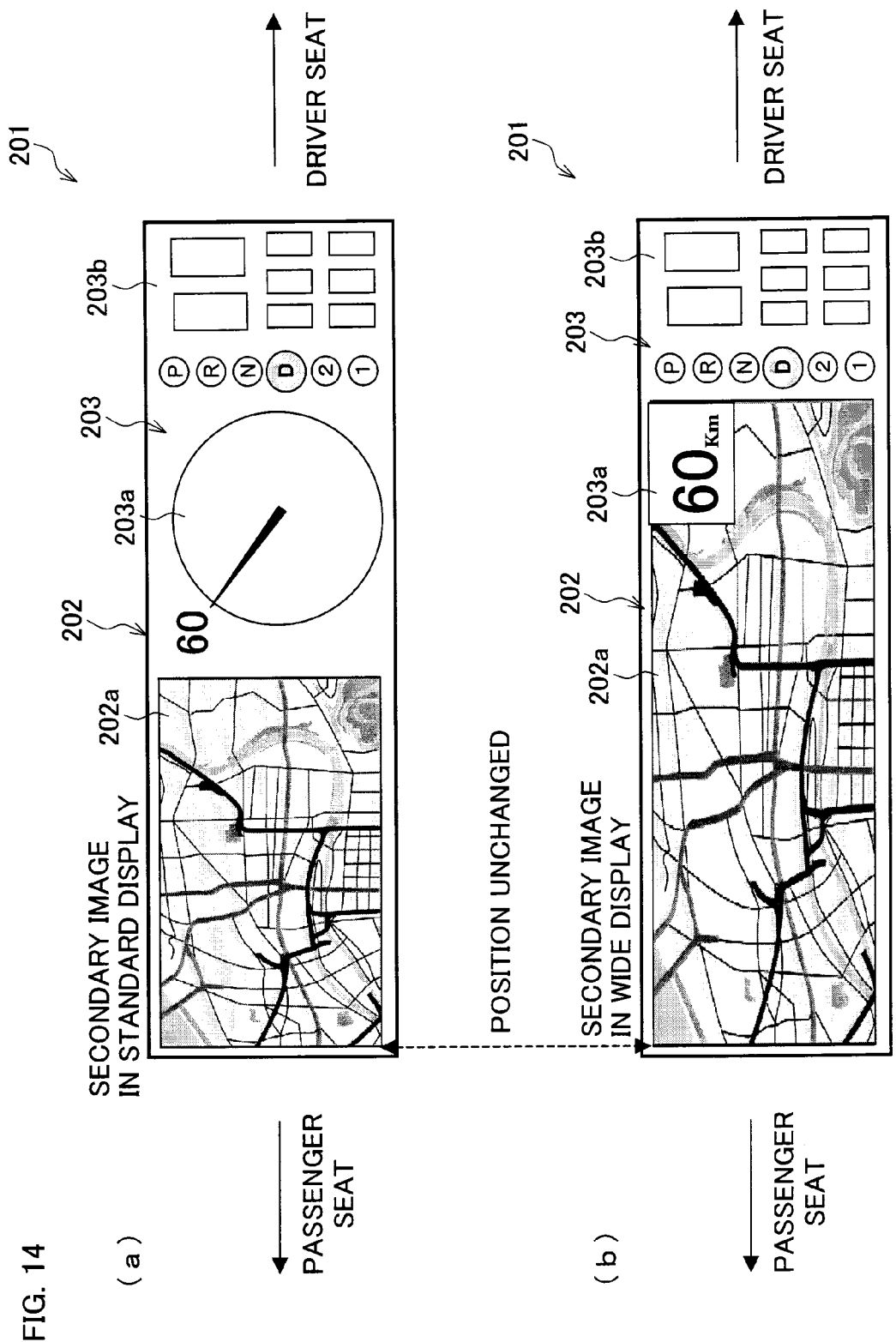

ONBOARD DISPLAY DEVICE, ONBOARD DISPLAY SYSTEM AND VEHICLE

BACKGROUND OF THE INVENTION

1. Field of the Invention

The present invention relates to onboard display devices and systems for displaying the traveling speed, engine speed, and other conditions of the vehicle. The present invention also relates to vehicles in which the onboard display system is installed.

2. Description of the Related Art

New automobile instrument panels, or onboard display devices, have been suggested. They display driver-supporting information, such as navigation images ("secondary images"), as well as the traveling speed, engine speed, and other information on the conditions of the vehicle. See Japanese published patent application 6-195056/1994 (Tokukaihei 6-195056; published on Jul. 15, 1994) and Japanese published patent application 9-123848/1997 (Tokukaihei 9-123848; published on May 13, 1997).

For example, Tokukaihei 6-195056 provides a wide display screen to improve on visibility, road safety, and ease in operation. Monitor images around the vehicle are displayed on the wide screen along with traveling speed, fuel, and other vehicle-related information.

Tokukaihei 9-123848 provides a wide display device through which the driver is presented with necessary information depending on traveling conditions, to allow for comfortable and smooth driving.

Tokukaihei 6-195056 discloses a display device with a screen measuring 160 to 180 mm in width and 80 to 100 mm in height. The patent application also discloses a specific aspect ratio of 16:9 for display screen. The aspect ratio is the width/height ratio of a display area.

However, navigation images are typically displayed at an aspect ratio of 4:3, 15:9, or 16:9. For example, if a 12:9 navigation image, with the least width, is produced on a Tokukaihei 6-195056 display screen (16:9), the remaining part of the screen has a 4:9 aspect ratio. This means that other images will appear vertically elongated.

A speed display device mounted on an instrument panel for a vehicle is expected also to produce other displays including navigation and rearview images.

If a navigation image is produced on the display device disclosed in Tokukaihei 6-195056 at 4:3 (12:9), the remaining 4:9 part of the screen is not large enough to accommodate a round speedometer display.

The speedometer and related displays are more important than, for example, the navigation system in terms of safety. However, when they are displayed side by side on the Tokukaihei 6-195056 display device, the former appear much smaller and more difficult to recognize. This situation will lead to safety and ease-in-operation issues.

As to the Tokukaihei 9-123848 display device, sufficient resolution is available if navigation and other secondary images and vehicle condition images presenting the conditions of the vehicle are switchably displayed. If these images are however displayed at the same time, sufficient resolution is not ensured for each kind of image. The resultant display is hard to recognize for the driver. This will again lead to safety and ease-in-operation issues.

SUMMARY OF THE INVENTION

The present invention, conceived in view of the problems, has an objective to provide an onboard display device and systems, as well as a vehicle incorporating the device and system. The device and system achieves improved visibility to the eye of the driver in the concurrent display of a secondary image and a vehicle condition image. The former includes, for example, a navigation image. The latter presents information on the conditions of the vehicle and includes, for example, a speed display. The device and system thus achieves improved road safety and ease in operation.

An onboard display device in accordance with the present invention, to achieve the objective, is characterized by the inclusion of a display section attached to an instrument panel of a vehicle. The display section shows at least the speed as vehicle condition images indicating the conditions of the vehicle. The display section also shows a navigation image and other secondary images. The display section measures greater in width than in height with an aspect ratio of 7:3 or greater.

Generally, at a 4:3 aspect ratio, a navigation image and other secondary images are displayed with sufficient visibility. At a 3:3 aspect ratio, a common, round speedometer can still be displayed with sufficiently visibility.

Therefore, if a navigation image and other secondary images are shown at the 4:3 aspect ratio, the foregoing arrangement where the display area on the display section measures greater in width than in height with the 7:3 or greater width/height ratio (aspect ratio) can still accommodate a display area having the 3:3 aspect ratio for the vehicle condition images.

This allows for a visibility-improved simultaneous display of the secondary image, such as a navigation image, and the vehicle condition image, such as a speed display, which presents information on the conditions of the vehicle. As a result, the onboard display device offers improvement in visibility, safety, and easy-of-use to the driver.

Secondary images, other than the navigation image, include for example a television image, a camera image, an email message transmission/reception image, and other images which are useful information to the driver or a fellow passenger.

The aspect ratio only needs be 7:3 or greater. For example, at 8:3 or 32:9, two 4:3 or 16:9 display areas can be accommodated. As a result, high visibility displays are produced in both areas, giving extra safety to the driver.

An onboard display system in accordance with the present invention is characterized by the inclusion of an onboard display device, imaging devices, and a control device. The onboard display device is arranged in accordance with the present invention. The imaging devices take images to and near the front, rear, right, and left of the vehicle. The control device controls imaging operations of the imaging devices so that a front image, a rear image, a right-hand image, and a left-hand image taken by the imaging devices can be all simultaneously shown on the display section of the onboard display device, According to the arrangement, the imaging devices takes images to and near the front, rear, right, and left of the vehicle. The images are simultaneously shown on the display section of the vehicle display device. The driver can reliably check the surroundings of the vehicle for safety when start moving the vehicle.

A vehicle in accordance with the present invention is characterized by the inclusion of an onboard display device, imaging devices, a reverse gear, and a display control device. The onboard display device is arranged in accordance with the present invention. The imaging devices take images to and near the rear of the vehicle. The reverse gear is selected to back the vehicle. Under the control of the display control device, the onboard display device, upon a selection of the reverse gear, shows a widthwise elongated image to and near the rear of the vehicle as taken by the imaging devices at an aspect ratio more than or equal to 2.3:1.

It is not sufficient to display only the space where the vehicle will be parked. The aspect ratio is determined in order that at least about halves of adjacent parking spaces are visible, provided that the body of the vehicle is 170 cm wide (e.g., Japanese compact cars), the parking space is 230 cm wide, and the vehicle is 200 cm high.

Showing a widthwise elongated image to and near the rear of the vehicle in association with the reverse gear at an aspect ratio of 2.3:1 or greater as in the foregoing arrangement provides an easy-to-see image. Thus, the display device is capable of highly visible displays when parking the vehicle, allowing the driver to safely drive backwards.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIGS. 14(*a*), 14(*b*) are drawings showing examples of the secondary image display produced on the display section shown in FIG. 11.

DETAILED DESCRIPTION OF THE PREFERRED EMBODIMENTS

Preferred Embodiment 1

The following will describe a preferred embodiment of the present invention.

In the present preferred embodiment, the onboard display device in accordance with the present invention is used as a display device which is part of an instrument panel on an automobile.

Figure 2:
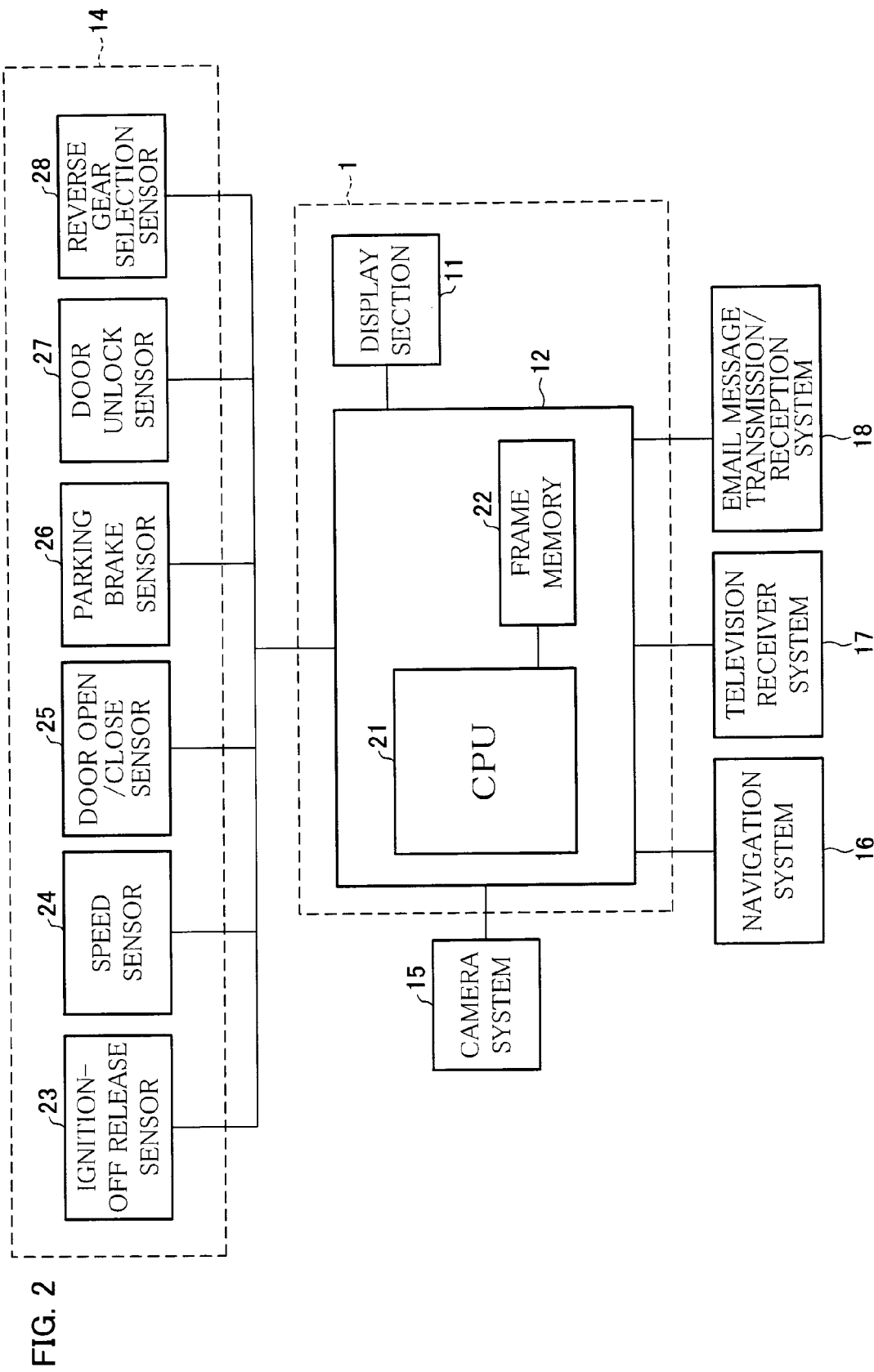
FIG. 2 is a schematic block diagram of the onboard display system incorporating the display section.

The onboard display system in accordance with the present preferred embodiment contains an onboard display device 1 as shown in FIG. 2. The onboard display device 1 is mounted to an onboard instrument panel. The device 1 displays at least the speed of the vehicle. The device 1 may also display information on other conditions of the automobile. The device 1 includes a display section 11 and a display control section 12. The display section 11 includes a liquid crystal display panel for the display of secondary images. The display control section 12 controls the display on the display section 11. The display section 11 will be described later in detail. The secondary images include, for example, navigation images, television images, camera images, incoming/outgoing email message images, and other images which present information other than the information on the automobile per se (i.e., useful information to the driver and other passengers).

To display these various images on the display section 11, the display control section 12 is connected to a sensor system 14, a camera system 15, a navigation system 16, a television receiver system 17, and an email message transmission/reception system 18. The sensor system 14 collects information on the conditions of the automobile. The camera system 15 captures images around the automobile. The navigation system 16 produces a navigation image. The television receiver system 17 receives television image. The email message transmission/reception system 18 produces an email message transmission/reception image.

The display control section 12 includes a CPU 21 as a primary control section. The section 12 also includes a frame memory 22 temporarily record various image data.

The sensor system 14 includes an ignition-off release sensor 23, a speed sensor 24, a door open/close sensor 25, and a parking brake sensor 26. The ignition-off release sensor 23 detects the releasing of ignition's off-state of the automobile. The speed sensor 24 detects the traveling speed of the automobile. The door open/close sensor 25 detects an opening/closing of a door of the automobile. The parking brake sensor 26 detects an active parking brake of the automobile. Sensor outputs provide a basis for further processes (to be detailed later).

The camera system 15 may be mounted at any place on the body of the automobile. The system 15 includes a set of cameras so that they can capture images of the surroundings around the automobile (a 360° view, including the front, back, and sides). Preferable cameras for the system 15 are, for example, omnidirectional ones disclosed in Japanese published patent application 2003-125396 (Tokukai 2003-125396; published on Apr. 25, 2003). The layout of the omnidirectional cameras for the camera system 15 will be detailed later.

The navigation system 16, television receiver system 17, and email message transmission/reception system 18 are commonly used ones.

Figure 1:
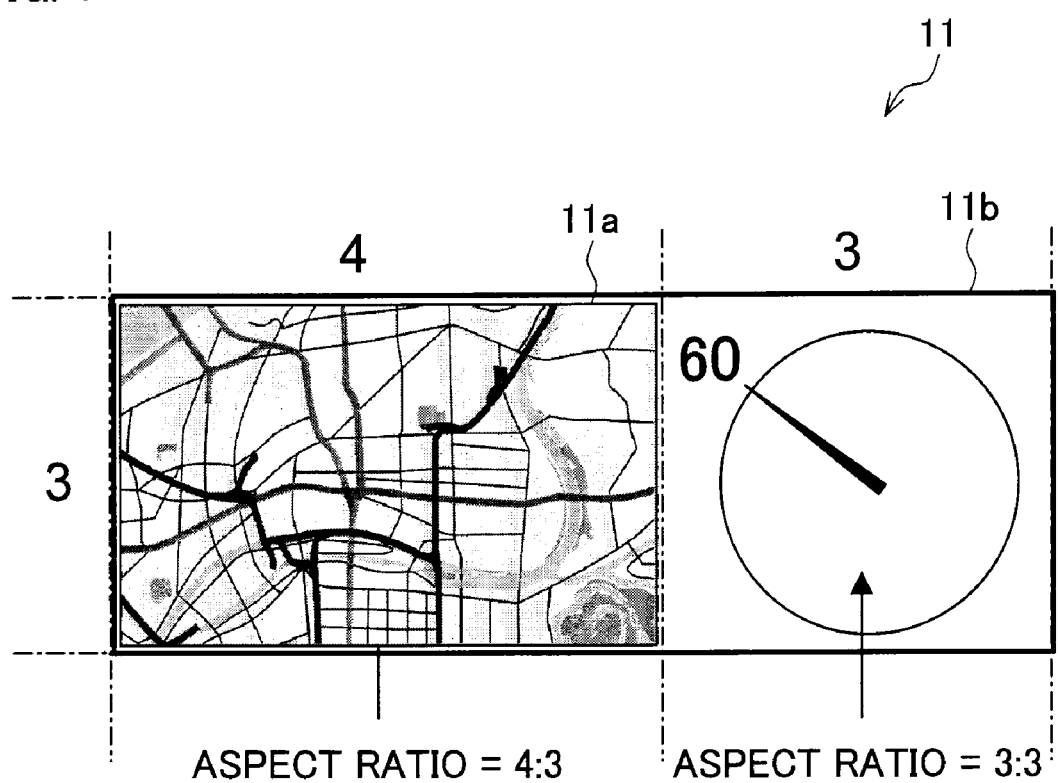
FIG. 1, illustrating a preferred embodiment of the present invention, is a plan view of a display section for an onboard display device.

Now, the display section 11 will be described in reference to FIG. 1.

The display section 11, elongated widthwise, has an aspect ratio of 7:3. An aspect ratio is the width/height ratio of a display area (hereinafter, "screen size"). As shown in FIG. 1, the display section 11 provides two display areas at different screen sizes: a first display area 11a at a screen size of 4:3 and a second display area 11b at a screen size of 3:3.

The first display area 11a displays a secondary image, for example, an image given by the navigation system ("navigation image"). The second display area 11b displays a speedometer or other image presenting the conditions of the vehicle.

Typical screen sizes for a navigation image is 4:3, 15:9, and 16:9. The first display area 11a is set up at a screen size of 4:3 accordingly.

The speed display on an instrument panel requires a screen size of 3:3 or greater in consideration of road safety. The second display area 11b is set up at a screen size of 3:3 accordingly.

Having the landscape screen size of 7:3, the display section 11 is suited to produce both a navigation image and a speed display.

Conventional systems could not help but narrow down the speed display area to produce a navigation image or could only display too small a navigation image for the driver to easily obtain navigation information. These problems no longer happen with the 7:3 screen size.

Whilst the first display area 11a with the 4:3 screen size is displaying, for example, a navigation image, the second display area 11b with the 3:3 screen size provides a square display area where, for example, a speedometer can be displayed. A common speedometer display has a round shape. The second display area 11b, being square, ensures a minimum level of visibility that is required. Driving safety can be improved with the display section 11 thus arranged.

The screen size of the display section 11 may exceed 7:3, for example, 8:3. When this is the case, the display section 11 can accommodate a first display area 11a and a second display area 11b, both at a screen size of 4:3. The onboard display device 1 is therefore fabricable by combining those existing liquid crystal display panels with the 4:3 screen size. At 30:9, the onboard display device 1 is similarly fabricable by combining those existing panels with a screen size of 15:9. At 32:9, the onboard display device 1 is fabricable again by combining those existing panels with a screen size of 16:9.

A liquid crystal display panel with a high resolution produces clear images. The navigation image and the speed display are highly visible, improving safety.

Figure 3:
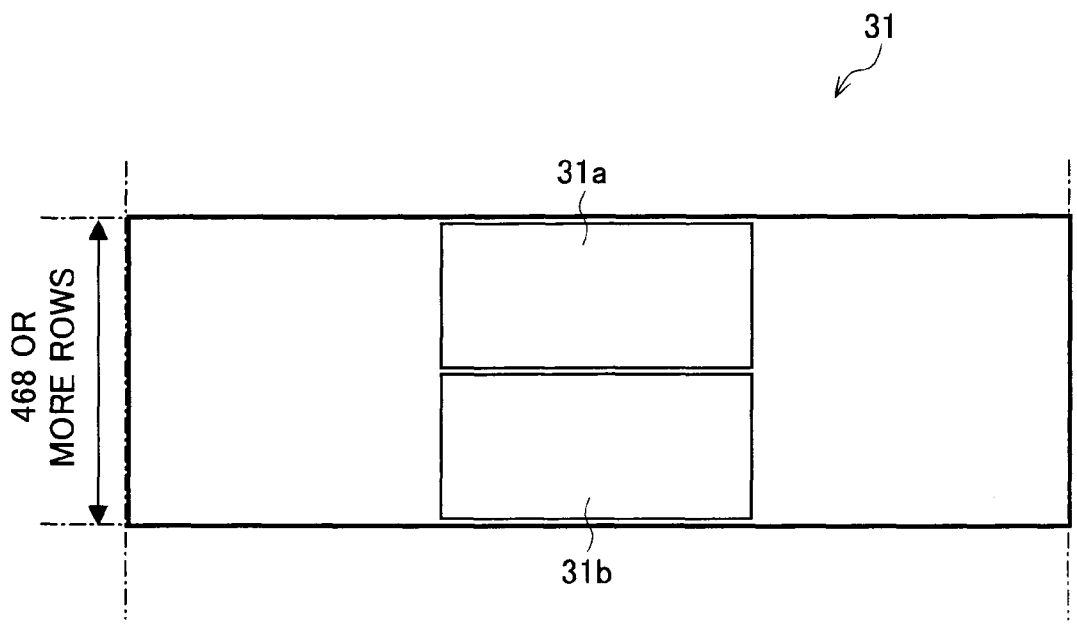
FIG. 3 is a drawing showing an example of resolution for the display section.

An example of such a high resolution liquid crystal display panel is shown in FIG. 3. The display panel 31 contains 468 or more horizontal rows of pixels in a screen size of 7:3. In other words, the display section 31 has 468 or more scan lines parallel to the longer side. The 7:3 screen size gives the number of columns (vertical lines) of pixels at 1092.

So, the display section 31 can accommodate two display areas in W-QVGA format (400 columns×234 rows) on top of each other. The areas are shown as a first display area 31a and a second display area 31b.

The areas 31a, 31b are capable of high resolution displays. Assigning a navigation image display to the first display area 31a and a speed display to the second display area 31b, the display section 31 produces an image display which is easily recognizable to the driver, improving safety.

With these 468 scan lines parallel to the longer side ("rows"), at least two displays, each in W-QVGA format, can fit into the screen on top of each other. Two displays are produced on top of each other at high resolution, allowing the driver make accurate decisions from the images. Therefore, for example, a moving image can be so clearly produced on the screen that the driver can readily recognize it. Road safety will be thus improved.

Preferably, the section 31 contains 480 rows, which is equal to the number of rows involved in the VGA and WVGA format. Accordingly, a secondary display can be produced in the VGA (Video Graphics Array; 640 columns×480 rows) or WVGA (Wide Video Graphics Array; 800 columns×480 rows) format, giving significantly high visibility.

Figure 4:
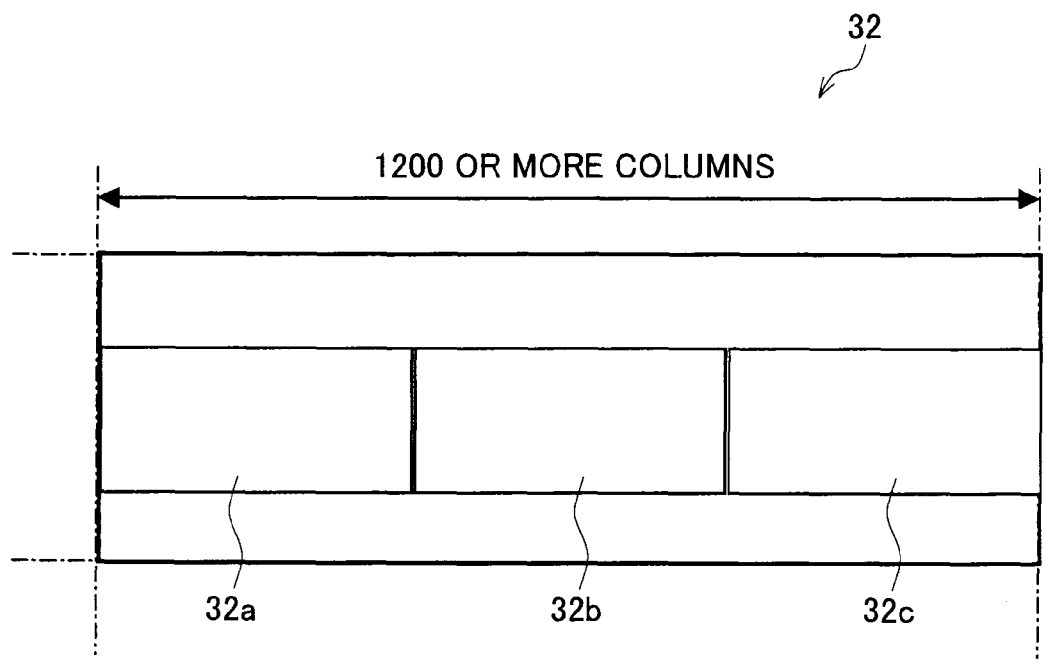
FIG. 4 is a drawing showing another example of resolution for the display section.

Another example of a resolution-improved liquid crystal display panel is given in FIG. 4. The display section 32 has a screen size of 7:3. The section 32 contains 1200 or more columns.

The display section 32 can accommodate three display areas (first, second, and third display areas 32a, 32b, 32c) side by side, each in the W-QVGA (400 columns×234 rows) format.

The section 32 is capable of a high resolution display in each display area. Thus, assigning, for example, a navigation image to the first display area 32a, a speed display to the second display area 32b, and a rear view display to the third display area 32c, the display section 32 is capable of producing easily recognizable displays to the driver. Road safety will be thus improved.

Displays shown in the display areas are not limited to these examples. It is preferable if, for example, the displays present useful information to the driver or a fellow passenger.

To increase the visibility of the onboard display device 1, a display section 33 may be used which contains 1200 or more columns and 468 or more rows. See FIG. 5.

When each display area is in the Q-WVGA format (400 columns×234 rows), the section 33 can accommodate three or more display areas side by side and two or more display areas on top of each other. With each display area being in the W-QVGA format, the section 33 is capable of a high resolution display in each display area. The display section 32 is thus capable of producing easily recognizable displays to the driver. Road safety will be thus improved.

Figure 5:
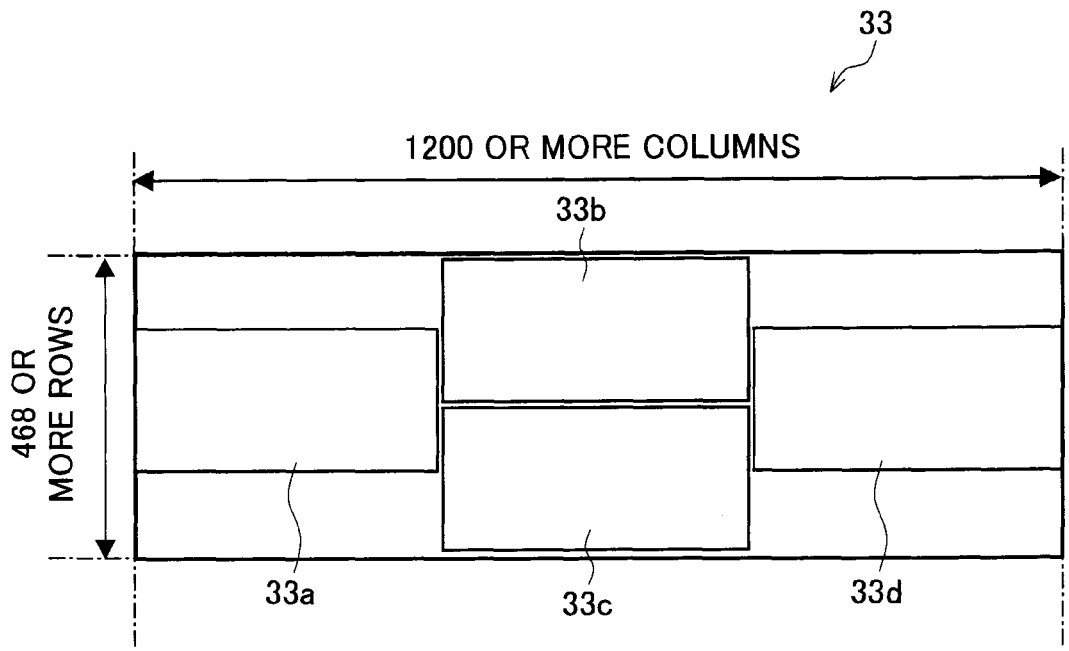
FIG. 5 is a drawing showing yet another example of resolution for the display section.

An example of such a screen is shown in FIG. 5. The display section 33 has four display areas: a first display area 33a, a second display area 33b, a third display area 33c, and a fourth display area 33d. The first display area 33a appears on the left of the screen. The second and third display areas 33b, 33c are in the middle of screen, stacked on top of each other. The fourth display area 33d appears on the right of the screen.

On the display section 33 thus arranged, one may assign, for example, a left-hand view display to the first display area 33a, a front view display to the second display area 33b, a rear view display to the third display area 33c, and a right-hand view display to the fourth display area 33d. See FIG. 6. With the entire scene around the vehicle being reproduced on the display section 33 in this manner, the driver can intuitively recognize the displays with no mistake. For example, the driver in a parked or otherwise stationary vehicle can reliably check the surroundings for traffic before starting. Road safety will be thus improved.

As to displays in this case, a left side image and a right side image are displayed on the left side and the right side respectively so that the width direction of the W-QVGA format is the height direction of the display device. Between them, the front is up, the back is down to produce a horizontally elongated display in the W-QVGA format. By producing a display in this manner, the driver can obtain sufficient information at high resolution in all the four directions. When vertically elongated video is to be displayed regarding the side, like when a camera shooting a side view is positioned at the side of the rooftop, such a display, the direction and the display match. Mistakes rarely occur in visual recognition.

To help recognize traffic ahead of and behind the automobile, preferably, the front view is displayed substantially at the center of the screen, slightly off center in an substantially upward direction. Such a displays is possible by means of superimposition and other image synthesis. The display helps reliable visual recognition by the drive, improving safety.

Figure 6:
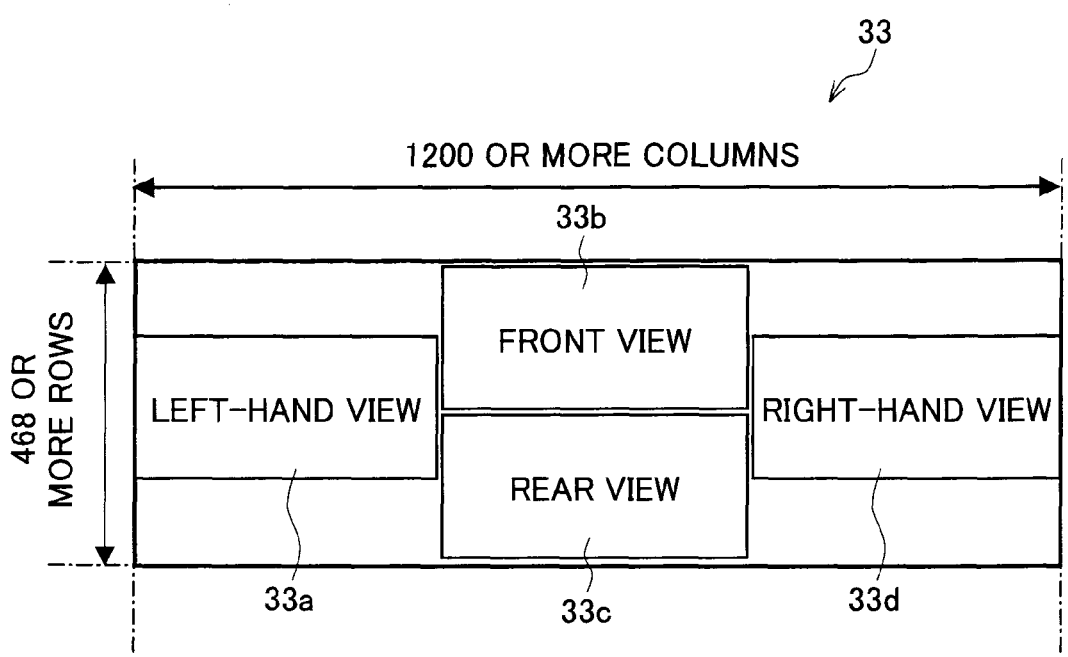
FIG. 6 is a drawing showing an example of display produced on the display section with the resolution shown in FIG. 5.
Figure 7:
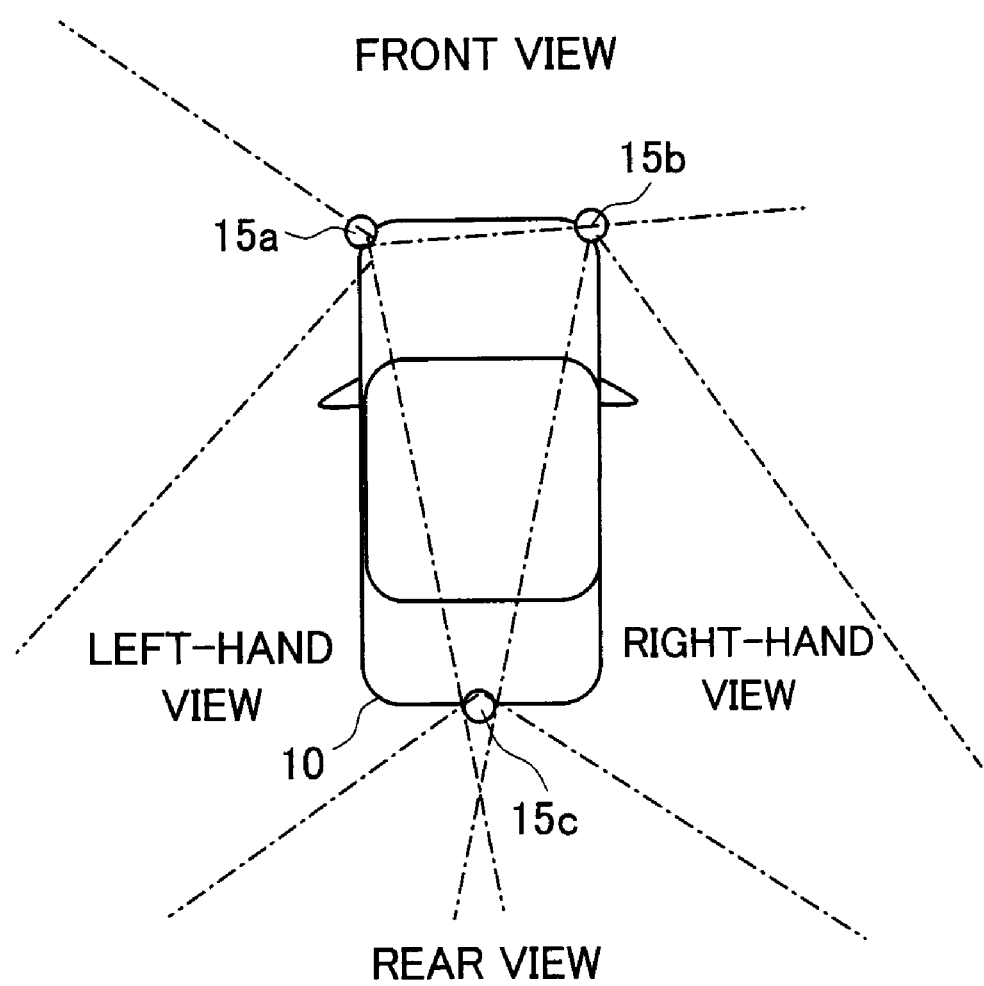
FIG. 7 is a plan view illustrating the setup of omnidirectional cameras mounted to an automobile to achieve the display example shown in FIG. 6.

To make the display shown in FIG. 6 feasible, the aforementioned omnidirectional cameras for the camera system 15 may be mounted as shown in FIG. 7, as an example. According to FIG. 7, there are provided a first omnidirectional camera 15a at the front left corner of the automobile 10, a second omnidirectional camera 15b at the front right corner of the automobile 10, and a third omnidirectional camera 15c at the mid-rear of the automobile 10.

An image captured by the first omnidirectional camera 15a is displayed as a left-hand image in the first display area 33a on the display section 33 in FIG. 6. Part of the captured image is displayed in the second display area 33b as a front view display. The image captured by the second omnidirectional camera 15b is displayed as a right-hand image in the fourth display area 33d on the display section 33 in FIG. 6. Part of the captured image is displayed in the second display area 33b as a front view display. The image captured by the third omnidirectional camera 15c is displayed as a rear view display in the third display area 33c on the display section in FIG. 6.

In this example, the four direction images produced on the display section 33 are fed from three omnidirectional cameras. Four or more omnidirectional cameras may be used instead.

The camera system 15 may not necessarily involve the aforementioned omnidirectional cameras. Alternatives include, for example, general CCDs and C-MOS image sensors equipped with a standard or wide-angle lens. These alternatives however have smaller shooting angles than the omnidirectional cameras.

Figure 8:
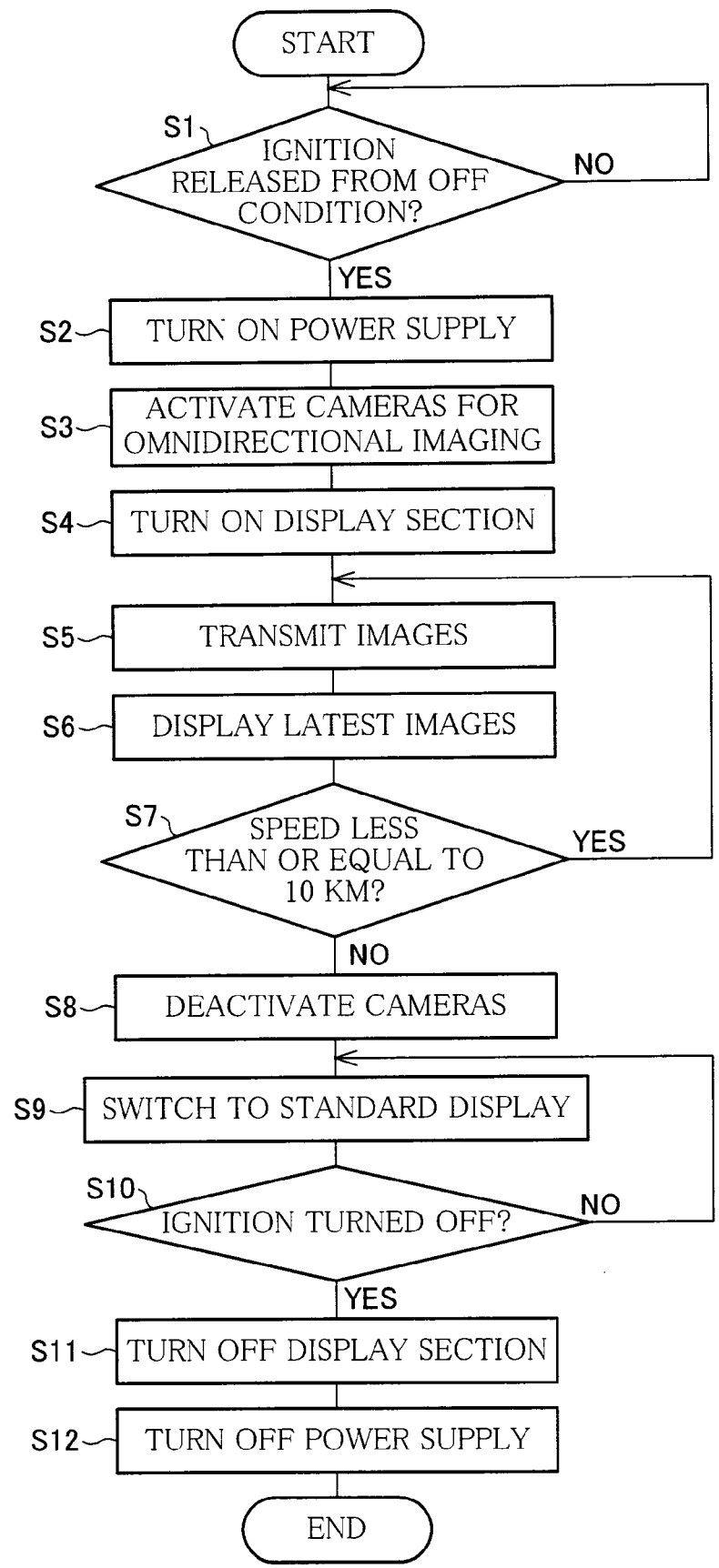
FIG. 8 is a flow chart illustrating an example of a display process flow for an image captured by the omnidirectional cameras shown in FIG. 7.
Figure 9:
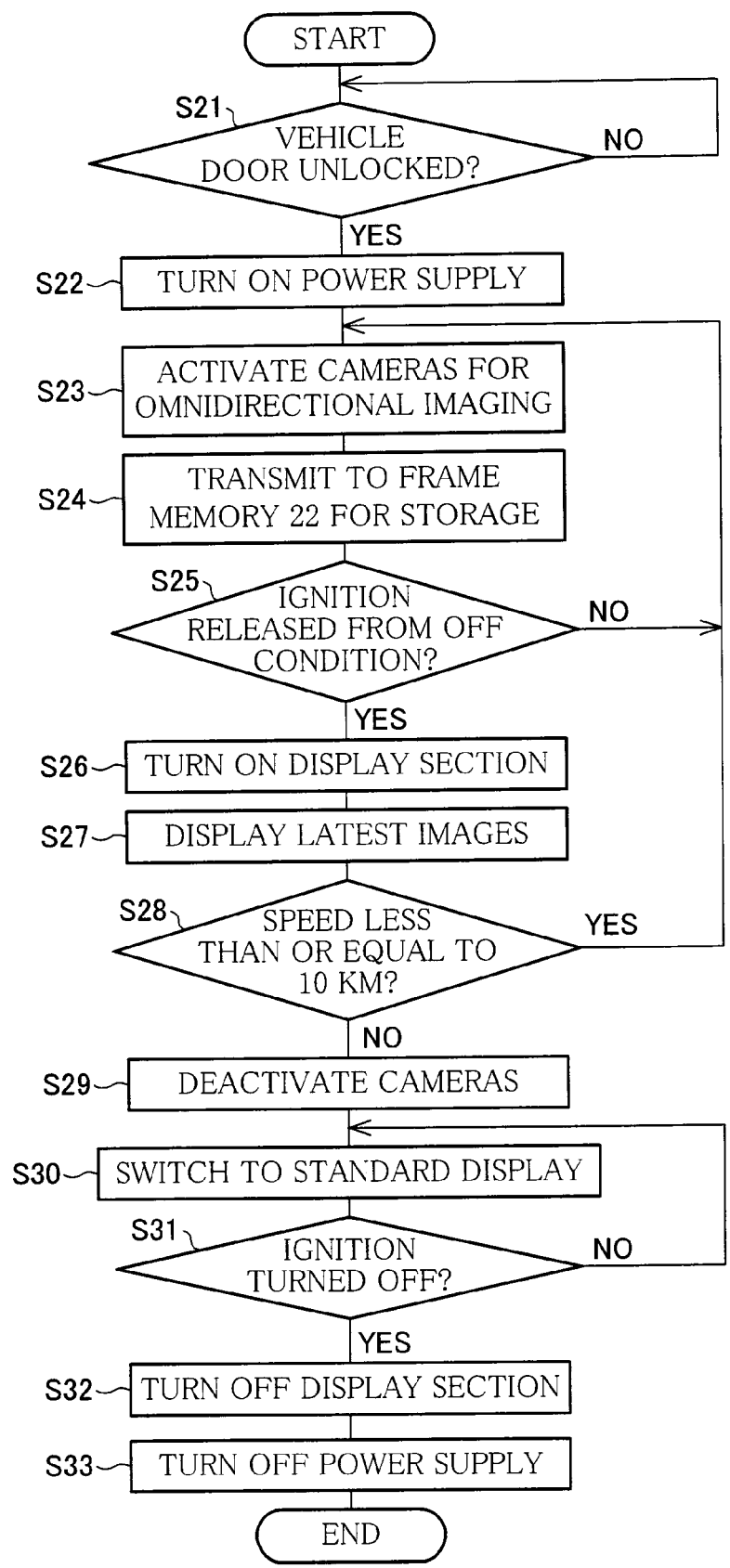
FIG. 9 is a flow chart illustrating another example of a display process flow for an image captured by the omnidirectional cameras shown in FIG. 7.
Figure 10:
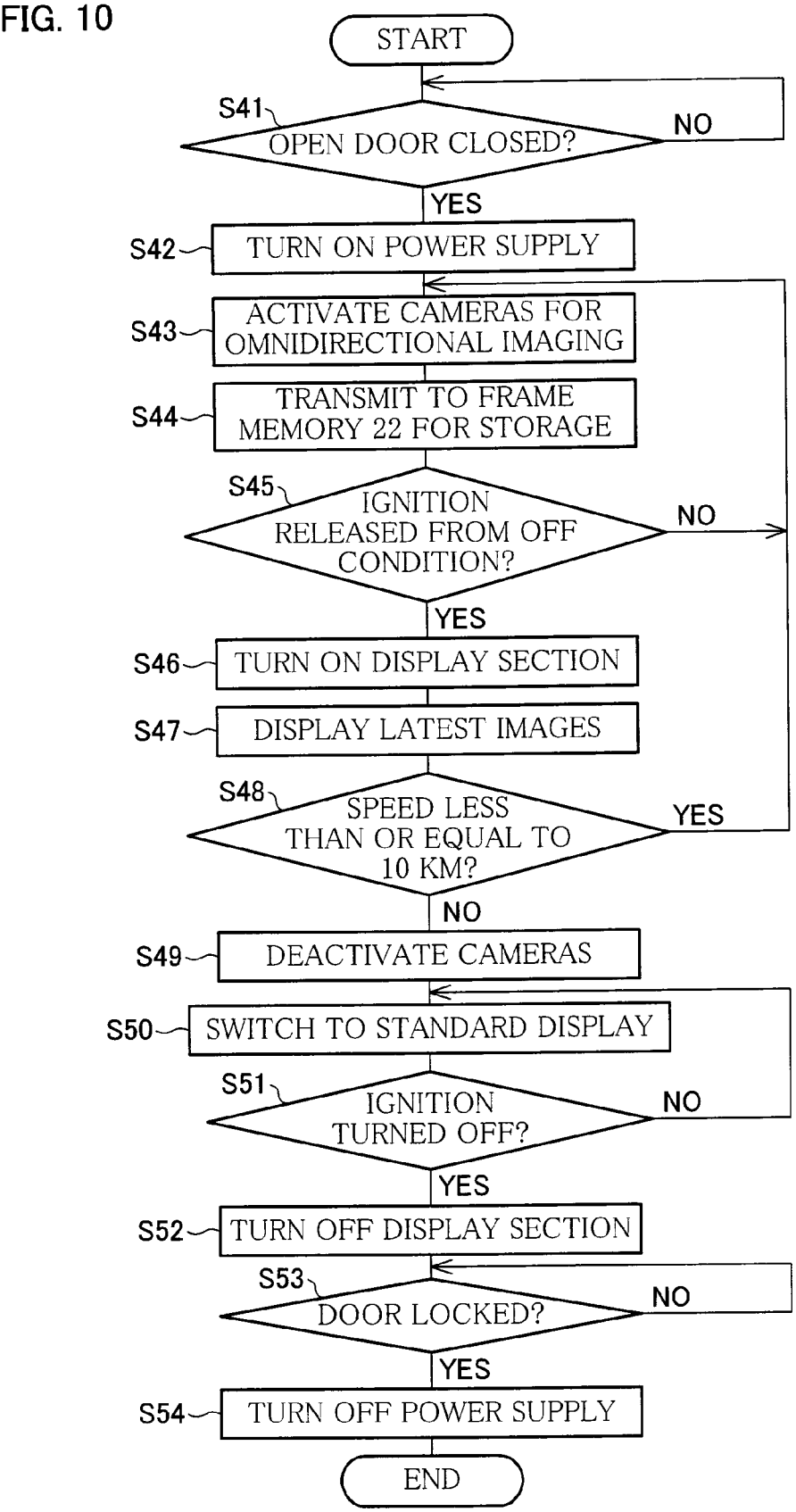
FIG. 10 is a flow chart illustrating yet another example of a display process flow for an image captured by the omnidirectional cameras shown in FIG. 7.

Generally, the four direction images around the automobile 10 on the display section 33 may be useful if displayed before starting the automobile 10. The following will describe a flow of procedures to display the four direction images on the display section 33. Reference will be made to a block diagram in FIG. 2 and flow charts shown in FIG. 8 to FIG. 10.

First, a flow of procedures for producing a display will be described for a case where the four direction images are displayed on a display screen in response to an ignition turn-on action. Reference will be made to the flow chart in FIG. 8.

Relying on a detection signal from the ignition-off release sensor 23 (see FIG. 2), the display control section 12 determines whether the driver has turned on the ignition, in other words, released the ignition from off condition (step S1).

Upon determining that the driver has released the ignition from off condition, the section 12 turns on the power supply for the camera system 15 (step S2) to activate the omnidirectional cameras for omnidirectional imaging (step S3).

Thereafter, the section 12 turns on the display section 11 (step S4) and transmits the images captured by the omnidirectional cameras to the display section 11 (step S5).

The display section 11 then displays the received images, which are the latest images (step S6).

Subsequently, the display control section 12 determines, according to a signal from the speed sensor 24, whether the speed of the automobile exceeds 10 km (step S7).

Upon determining that the speed of the automobile does not exceed 10 km, the section 12 proceeds to step S5 where the display section 11 continues to display the latest images.

In contrast, if the section 12 determines in step S7 that the speed of the automobile exceeds 10 km, the section 12 deactivates the omnidirectional cameras (step S8) and switches to a standard display (navigation image, speed display, etc.) (step S9).

In step S7, the determination whether to deactivate the omnidirectional cameras is made based on the speed of the automobile. This is not the only possibility. For example, a parking brake sensor 26 may be used to make a decision based on whether the parking brake is released. Further, there may be provided a push button inside the vehicle which, when pressed, turns off the omnidirectional cameras.

Next, according to a detection signal from the ignition-off release sensor 23, the display control section 12 determines whether the ignition is turned off (step S10). This determination is made while the display section 11 is producing a standard display under the control of the section 12.

Upon determining that the ignition is turned off, the section 12 turns off the display section 11 (step S11) and also turns off the power supply for the camera system 15 (step S12). The display section 11 continues to produce a standard display until the ignition is determined to be turned off.

Now, a flow of procedures for producing a display will be described for a case where the four direction images are displayed on a display screen in response to a door unlock action. Reference will be made to the flow chart in FIG. 9.

First, the display control section 12 determines, according to a signal from a door unlock sensor 27, whether a vehicle door is unlocked (step S21). Upon determining that a door is unlocked, the section 12 turns on the power supply for the camera system 15 (step S22) to activate the omnidirectional cameras for omnidirectional imaging around the vehicle (step S23).

Images captured in step S23 are transmitted to the frame memory 22 in the display control section 12 for storage (step S24).

Subsequently, the display control section 12 determines, according to a signal from the ignition-off release sensor 23, whether the driver has released the ignition from off condition (step S25).

Upon determining that the driver has not released the ignition from off condition, the section 12 proceeds to step S23. The section 12 transmits the images captured by the omnidirectional cameras to the frame memory 22 for storage until the ignition is released from off condition.

In contrast, upon determining in step S25 that the driver has released the ignition from off condition, the section 12 turns on the display section 11. The display section 11 displays the images stored in the frame memory 22, in other words, the latest images captured, under the control of section 12 (step S27).

Subsequently, the display control section 12 determines, according to a signal from the speed sensor 24, whether the speed of the automobile exceeds 10 km (step S28).

Upon determining that the speed of the automobile does not exceed 10 km, the section 12 proceeds to step S23 where the display section 11 continues to display the latest images.

In contrast, if the section 12 determines in step S28 that the speed of the automobile exceeds 10 km, the section 12 deactivates the omnidirectional cameras (step S29), and switches to a standard display (navigation image, speed display, etc.) (step S30).

In step S28, the determination whether to deactivate the omnidirectional cameras is made based on the speed of the automobile. This is not the only possibility. For example, a parking brake sensor 26 may be used to make a decision based on whether the parking brake is released. Further, there may be provided a push button inside the vehicle which, when pressed, turns off the omnidirectional cameras.

Next, according to a detection signal from the ignition-off release sensor 23, the display control section 12 determines whether the ignition is turned off (step S31). This determination is made while the display section 11 is producing a standard display under the control of the section 12.

Upon determining that the ignition is turned off, the section 12 turns off the display section 11 (step S32) and also turns off the power supply for the camera system 15 (step S33). The display section 11 continues to produce a standard display until the ignition is determined to be turned off.

Now, a flow of procedures for producing a display will be described for a case where the four direction images are displayed on a display screen in response to a door open/close action. Reference will be made to the flow chart in FIG. 10.

First, according to a signal from the door open/close sensor 25, the display control section 12 determines whether a vehicle door, which was open, is now closed (step S41). Upon determining that an open door is now closed, the section 12 turns on the power supply for the camera system 15 (step S42) to activate the omnidirectional cameras for omnidirectional imaging around the vehicle (step S43).

Images captured in step S43 are transmitted to the frame memory 22 in the display control section 12 for storage (step S44).

Subsequently, the display control section 12 determines, according to a signal from the ignition-off release sensor 23, whether the driver has released the ignition from off condition (step S45).

Upon determining that the driver has not released the ignition from off condition, the section 12 proceeds to step S43. The section 12 transmits the images captured by the omnidirectional cameras to the frame memory 22 for storage until the ignition is released from off condition.

In contrast, upon determining in step S45 that the driver has released the ignition from off condition, the section 12 turns on the display section 11. The display section 11 displays the images stored in the frame memory 22, in other words, the latest images captured, under the control of the section 12 (step S47).

Subsequently, the display control section 12 determines, according to a signal from the speed sensor 24, whether the speed of the automobile exceeds 10 km (step S48).

Upon determining that the speed of the automobile does not exceed 10 km, the section 12 proceeds to step S43 where the display section 11 continues to display the latest images.

In contrast, if the section 12 determines in step S48 that the speed of the automobile exceeds 10 km, the section 12 deactivates the omnidirectional cameras (step S49), and switches to a standard display (navigation image, speed display, etc.) (step S50).

In step S48, the determination whether to deactivate the omnidirectional cameras is made based on the speed of the automobile. This is not the only possibility. For example, a parking brake sensor 26 may be used to make a decision based on whether the parking brake is released. Further, there may be provided a push button inside the vehicle which, when pressed, turns off the omnidirectional cameras.

Next, according to a detection signal from the ignition-off release sensor 23, the display control section 12 determines whether the ignition is turned off (step S51). This determination is made while the display section 11 is producing a standard display under the control of the section 12. Upon determining that the ignition is turned off, the section 12 turns off the display section 11 (step S52). The display section 11 continues to produce a standard display until the ignition is determined to be turned off.

The display control section 12 then determines, according to a signal from a sensor (not shown) detecting locked doors, whether the doors are locked (step S53). Upon determining that the doors are locked, the section 12 turns off the power supply for the camera system 15 (step S53).

Generally, omnidirectional checks are preferably done before starting the automobile 10. The driver can very safely start moving the automobile 10 with the help of the four direction image display on the display screen which occurs in response to an ignition turn-on action, the unlocking of a door, or the opening/closing of the door(s).

Preferred Embodiment 2

The following will describe another preferred embodiment of the present invention. In the present preferred embodiment, the onboard display device in accordance with the present invention is used as an onboard instrument panel as in preferred embodiment 1.

Figure 11:
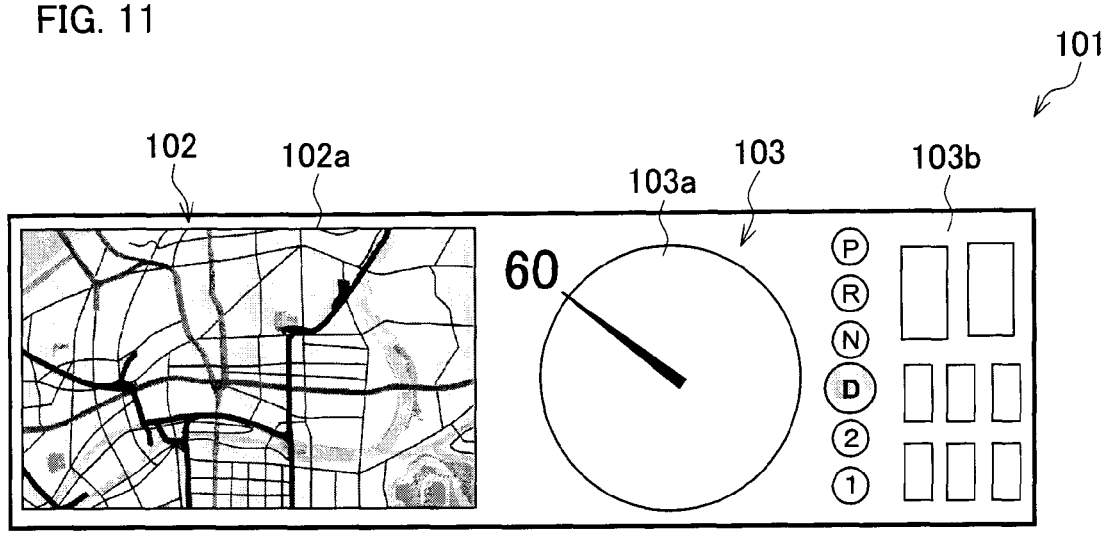
FIG. 11 is a drawing showing an example of the display produced on a display section of an onboard display device in accordance with the present invention.

The onboard display device in accordance with the present preferred embodiment contains a display section 101 as shown in FIG. 11. The section 101 is capable of wide displays similarly to the display section 11 of preferred embodiment 1 shown in FIG. 1. Unlike the display section 11 shown in FIG. 1, the display section 101 displays both secondary images and vehicle condition images at an identical aspect ratio of 4:3. The secondary images, not related to the speed and other conditions of the vehicle, are produced in a first display area 102. The vehicle condition images show the speed and other conditions of the vehicle and are produced in a second display area 103. The display section 101 has an aspect ratio of 8:3 accordingly.

The first display area 102 displays a navigation image 102a. The second display area 103 displays a speed display image 103a, as well as vehicle condition images 103b presenting informing of the gear position, fuel gauge, etc. The speed display image 103a shows a round speedometer. Reshaping the speedometer as a bar or representing it in numerals allows for a greater display area for the navigation image 102a.

Figure 12:
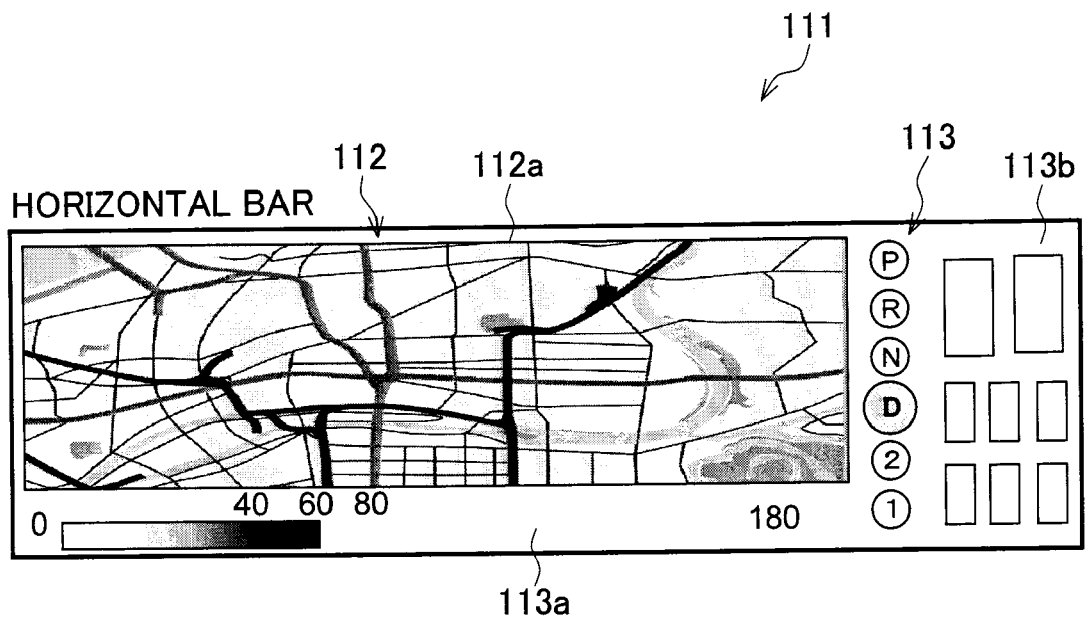
FIGS. 12(*a*), 12(*b*) are drawings showing designs of the display section when the example of the display produced on the display section in FIG. 11 is modified.
Figure 12:
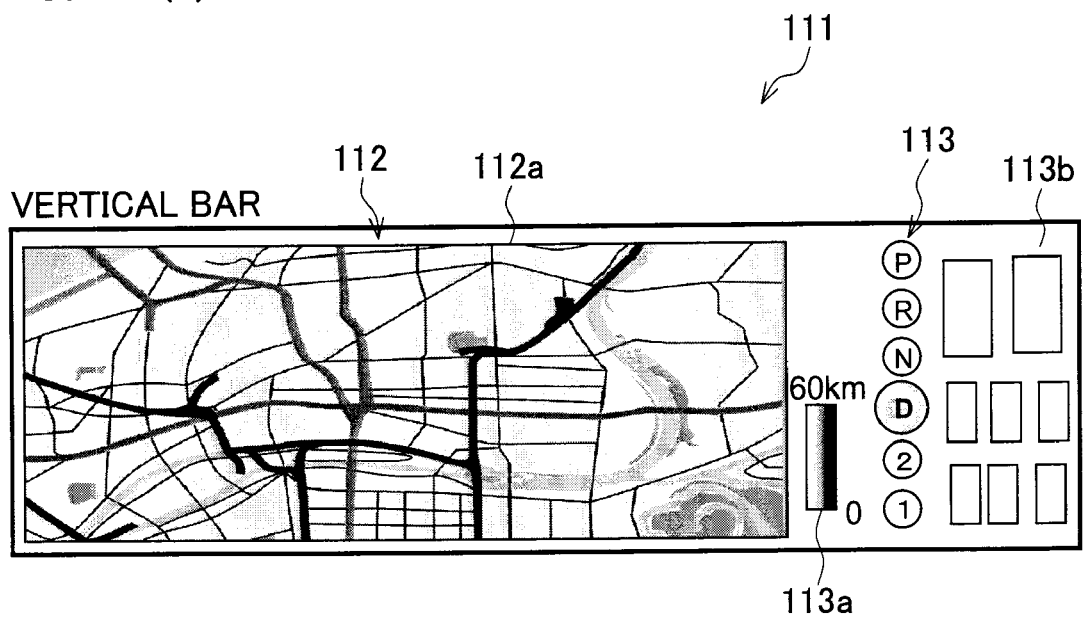

Bar speedometers are shown as examples on a display section 111 in FIGS. 12(a), 12(b). A numerical representation of the speedometer is shown as an example on a display section 121 in FIG. 13(a). Both the display sections 111, 121 have the same 8:3 aspect ratio as the display section 101 in FIG. 11.

The display section 111 in FIGS. 12(a), 12(b) shows a navigation image 112a in a first display area 112. The image 112a is extended widthwise reaching the area for the speed display image 103a shown in FIG. 11. In FIGS. 12(a), 12(b), vehicle condition images 113b, among the display images in the second display area 113, appear on the far right of the display section 111. The images 113b appear at almost the same position as the vehicle condition images 103b in the second display area 103 on the display section 101 in FIG. 11.

Referring to FIG. 12(a), the speed display image 113a in the second display area 113 appear below the navigation image 112a in the first display area 112. The image 113a shows a horizontal speed indicator bar. In FIG. 12(b), the speed display image 113a in the second display area appear between the navigation image 112a in the first display area 112 and the vehicle condition images 113b. The 113a shows vertical speed indicator bar.

Figure 13:
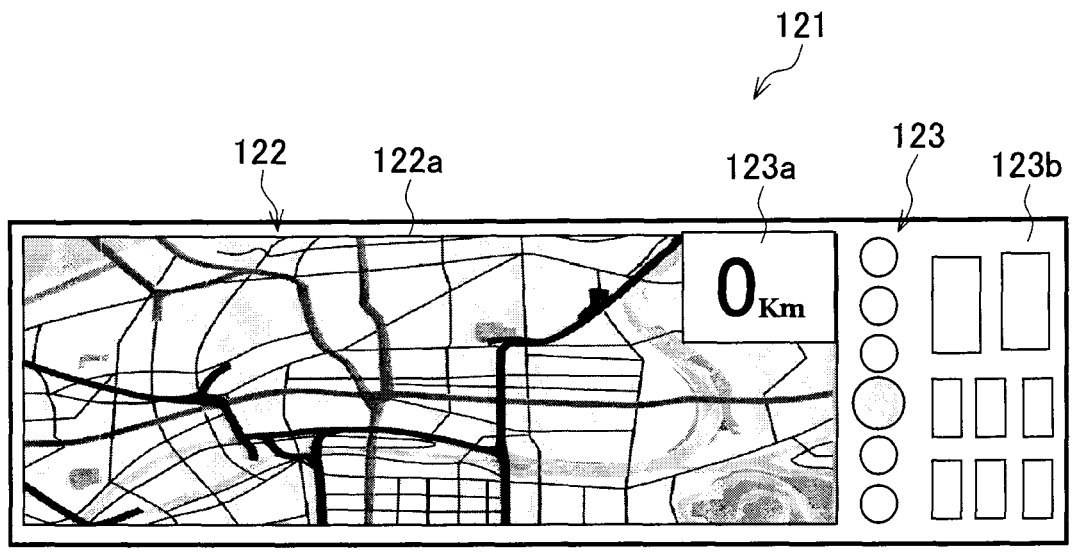
FIGS. 13(*a*), 13(*b*) are drawings showing designs of the display section when the example of the display produced on the display section in FIG. 11 is modified.
Figure 13:
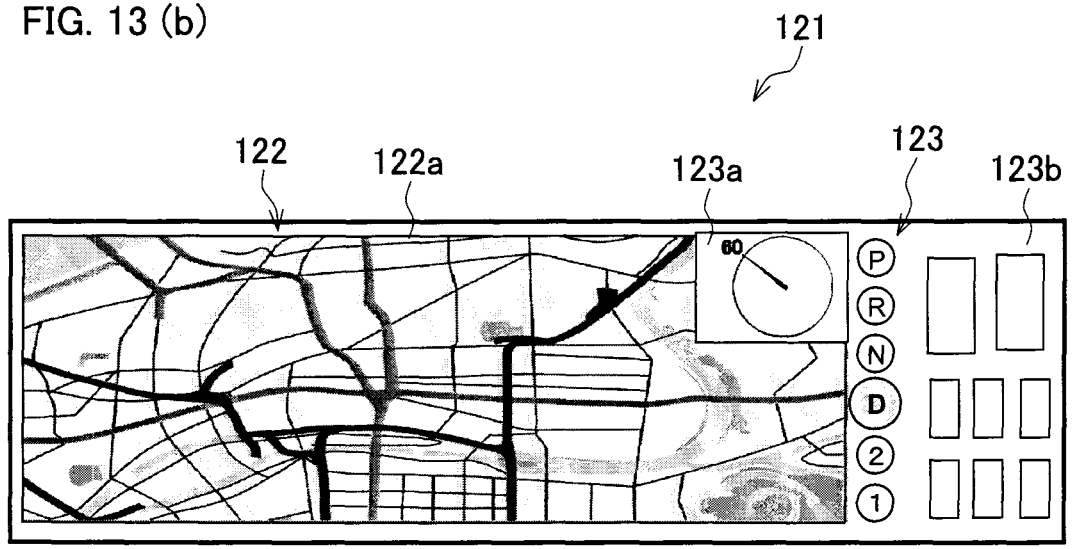

The display section 121 in FIGS. 13(a), 13(b) shows a navigation image 122a in the first display area 122. As with the image 112a in the display section 111, the image 122a is extended widthwise reaching the area for the speed display image 103a shown in FIG. 11. In FIGS. 13(a), 13(b), vehicle condition images 123b, among the display images in the second display area 123, appear on the far right of the display section 121. The images 123b appear at almost the same position as the vehicle condition images 103b in the second display area 103 on the display section 101 shown in FIG. 11.

Referring to FIG. 13(a), the speed display image 123a in the second display area 123 represents a numerical speedometer and appears in the top right corner of the navigation image 122a in the first display area 122.

FIG. 13(b) shows another speed display image 123a in the second display area 123. The image 123a appears in the top right corner of the navigation image 122a in the first display area 122 as with the one in FIG. 13(a). The speed display image 123a represents a round speedometer as in FIG. 11. Round speedometers have a problem of extremely poor visibility.

Therefore, when a wide navigation image is shown in the display section, the speedometer is most telling in terms of visibility if it is shaped as a bar rather than a circle or represented by numerals.

To produce a large display of a secondary image (for example, when the driver backs to park the vehicle, a large rear view display is easy to see), the speedometer, tachometer, and other displays are inevitably produced at reduced size. A large display is sure to be produced if the image is superimposed; the overlapping of the images however decreases the visibility of the rear view display. Accordingly, the speedometer, tachometer, etc. may be given in numerals or shown in a linear shape.

These designs ease degradation in visibility even with limited available space. Road safety is further improved.

As mentioned earlier, the display area for a navigation image and other secondary images is preferably rendered variable when the driver needs the images to be shown in the display area for the secondary images.

In this case, if a navigation image is displayed at an increased scale in such a manner that a reference point is not stationary, but movable, display edges move and will highly likely distract the attention of the driver.

When the display area for secondary images is scaled up through no proper process without defining any reference point, display area edges may move and seriously distract the attention of the driver. Therefore, movements of the edge parts need be rendered not that eye-catching.

This is achieved by extending the image toward the driver seat with a reference point being defined at an edge part of the image closer to the front passenger seat. Referring to FIGS. 14(a), 14(b), the following will describe this method by way of an example.

A display section 201 shown in FIG. 14(a) shares an identical design with the display section 101 shown in FIG. 11. A display section 201 shown in FIG. 14(b) shares an identical design with the display section 121 shown in FIG. 13(a).

Here, in an alteration of the display section 201 from the design in FIG. 14(a) to the one in FIG. 14(b), a navigation image 202a in the first display area 202 is extended toward the driver seat. A reference is given by a bus line (vertical display line) on the front passenger seat side of the navigation image 202a in the first display area 202.

As a result of the alteration, a speed display image 203a in the second display area 203 shown in FIG. 14(a) appears in FIG. 14(b) as a numerical speedometer in the top right corner of the now widened navigation image 202a. The layout of the vehicle condition images 203b of the second display area 203 has not changed in the scaling up of the navigation image 202a.

As described in the foregoing, the visibility of the vehicle condition images in the display section 201 which has the same aspect ratio in FIG. 14(a) and FIG. 14(b) is prevented from decreasing in the scaling-up process of a secondary image, by altering the manner in which the vehicle condition images are displayed.

If a secondary image is displayed at an increased scale in such a manner that a reference point is not stationary, display edges move and will highly likely distract the attention of the driver.

Accordingly, the display control section scales up the secondary image with any one of the vertical bus line (vertical display line) of the image 202 on the driver's side or the vertical bus line (vertical display line) of the image 202 on the front passenger's side being fixed. The vertical bus line (vertical display line) on the unfixed side is altered.

Accordingly, either one of the bus lines (vertical display lines) of a secondary image is fixed. The secondary image is scaled up by allowing the other bus line (vertical display line) to change. One of the display edges is fixed. This approach eliminates undesirable image fluctuations and allows the driver to comfortably check the images while driving. The approach is provides better safety to the driver.

With the screen size being varied based on a fixed reference point, the display device becomes free from undesirable image fluctuations and allows the driver to comfortably check images.

Using the onboard display system in accordance with the present preferred embodiment, the onboard display device 1 is capable of very wide image displays.

For example, when the driver backs the vehicle, the system presents a rear view fully across the wide screen. Thus, the display device is capable of highly visible displays when parking the vehicle, allowing the driver to safely drive backwards.

Specifically, upon a determination that the driver has selected the reverse gear, the display section 11 produces, under the control of the display control section 12, a rear view display at an aspect ratio of 2.3:1 or greater on the display screen of the display section 11. The determination is made by the display control section 12 based on a signal from a reverse gear selection sensor 28 shown in FIG. 2. The 2.3:1 or wider display when backing the vehicle provides very easy-to-see images.

For example, if the body of the vehicle is about 170 cm wide (e.g., Japanese compact cars), the parking space needs be about 230 cm wide which includes a 60 cm space for door opening/closing.

In a parking process, it is not sufficient to display only the space where the vehicle will be parked. it is desirable if at least about halves of adjacent parking spaces are visible.

A typical passenger vehicle is up to 2 m high.

Therefore, a display at an aspect ratio of 230×2/200=2.3 (:1) or greater is considered to be sufficient.

The resultant display device is capable of highly visible, wide displays at the 2.3:1 or greater aspect ratio when parking the vehicle, allowing the driver to safely drive backwards.

The preferred embodiments are based on a assumption that the display panel for use in the display section is a liquid crystal panel. This is not meant to be limiting at all. The display panel may be a plasma display device, an organic or inorganic EL panel, CRT, or other like display device.

In the vehicle display device in accordance with the present invention, the control device activates the imaging device in response to an ignition-induced start-up of the engine in the vehicle or automobile. Under the control of the control device, the display section simultaneously displays images of the front, rear, right, and left of the vehicle.

The activation in response to the engine start-up, along with the simultaneous display of the front, rear, right, and left images on the display section, allows the drivers to reliably check for safety all around the vehicle before moving.

In addition, as to displays in this case, a left side image and a right side image are displayed on the left side and the right side respectively so that the width direction of the W-QVGA format is the extended width directions of the display areas on the display section. Preferably, between them, the front is up, the back is down to produce a horizontally elongated display in the W-QVGA format. By producing a display in this manner, the driver can obtain sufficiently information at high resolution in all the four directions. The direction and the display match. Mistakes rarely occurs in visual recognition.

The members in the onboard display device 1 and processing steps in accordance with the preferred embodiments can be realized by a CPU or other computing means executing a computer program contained in a ROM (Read Only Memory), RAM, or other storage means to control a keyboard or like input means, a display device or like output means, or an interface circuit or like communications means. Therefore, the various functions and processes of the onboard display device of the present preferred embodiment can be realized if a computer equipped with these means simply reads a storage medium containing the program and executing the program. In addition, if the program is contained in a removable storage medium, the various functions and processes can be realized on any given computer.

Such a computer program storage medium may be a memory (not shown), such as a ROM, so that the process is executable on a microcomputer. Alternatively, a program medium may be used which can be read by inserting the storage medium in an external storage device (program reader device; not shown).

In addition, in either of the cases, it is preferable if the contained program is accessible to a microprocessor which will execute the program. Further, it is preferable if the program is read and then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetism tape and a cassette tape; a magnetism disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media holds a program in a fixed manner.

In addition, if the system is configured to be connectible to a communications network, such as the Internet, it is preferred that the storage medium contains the program in a flowing manner like downloading the program over the communications network.

Further, to download the program over the communications network, it is preferred if the program for download is stored in a main body device in advance or installed from another storage medium.

The preferred embodiments and examples described in Best Mode for Carrying Out the Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

The onboard display device in accordance with the present invention improves on visibility, road safety, and ease in operation. The device is applicable as an onboard display device mounted, for example, to an automobile.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An onboard display device attached to an instrument panel of a vehicle, comprising:
   a display screen being greater in width than in height and having an aspect ratio that is equal to or greater than 7:3, the aspect ratio being a width/height ratio of the display screen, said display screen including a first display area in which a secondary image including information other than information of the vehicle is displayed, and a second display area in which vehicle condition images including information of the vehicle are displayed, the first display area and the second display area being positioned side by side in a width direction; and
   a display control section arranged to control how the secondary image and the vehicle condition images are displayed; wherein
   said display control section is programmed to:
   (1) fix one of the vertical display lines of the secondary image at a left-hand side or a right-hand side of the secondary image; and
   (2) scale up the secondary image by:
      (a) extending the secondary image toward the left-hand side or the right-hand side;
      (b) moving a vertical display line at an unfixed side in a manner such that a motion of the vertical display line is visible by a driver of the vehicle; and
   (3) change how at least one of the vehicle condition images is displayed as the secondary image is being extended toward the left-hand side or the right-hand side.

2. The onboard display device as set forth in claim 1, wherein the aspect ratio of the second display area is equal to or greater than 3:3.

3. The onboard display device as set forth in claim 1, wherein the display control section displays an image of a speed meter that is one of the vehicle condition images while changing the image from a circular-shape to a column-shape or numbers.

4. A vehicle comprising an onboard display device as set forth in claim 1.

5. A vehicle comprising an onboard display device as set forth in claim 2.

6. A vehicle comprising an onboard display device as set forth in claim 3.

7. An onboard display device attached to an instrument panel of a vehicle, comprising:
   a display screen being greater in width than in height and having an aspect ratio that is equal to or greater than 7:3, the aspect ratio being a width/height ratio of the display screen, said display screen including a first display area in which a secondary image including information other than information of the vehicle is displayed, and a second display area in which vehicle condition images including information of the vehicle are displayed, the first display area and the second display area being positioned side by side in a width direction; and a display control section arranged to control how the secondary image and the vehicle condition images are displayed, when said display control section fixes one of the vertical display lines of the secondary image at a left-hand side or a right-hand side of the secondary image and displays a motion of a vertical display line at an unfixed side so as to scale up the secondary image, said display control section displaying the vehicle condition images in a different manner.

8. The onboard display device as set forth in claim 7, wherein the aspect ratio of the second display area is equal to or greater than 3:3.

9. The onboard display device as set forth in claim 7, wherein the display control section displays an image of a speed meter that is one of the vehicle condition images while changing the image from a circular-shape to a column-shape or numbers.

10. A vehicle comprising an onboard display device as set forth in claim 7.

11. A vehicle comprising an onboard display device as set forth in claim 8.

12. A vehicle comprising an onboard display device as set forth in claim 9.

* * * * *